United States Patent [19]
Rodriguez

[11] Patent Number: 5,441,116
[45] Date of Patent: Aug. 15, 1995

[54] MULTIPLE PURPOSE AGRICULTURAL POWER TOOL

[76] Inventor: Hermando H. Rodriguez, Jongbloed-1, Curacao, Netherlands Antilles

[21] Appl. No.: 130,677

[22] Filed: Oct. 4, 1993

[51] Int. Cl.$^6$ ............................................. A01B 39/10
[52] U.S. Cl. ........................... 172/101; 172/42; 172/84; 172/93; 172/103; 172/117; 172/247; 56/16.9; 56/17.6; 56/DIG. 9
[58] Field of Search ............... 299/37; 56/17.6, 16.9, 56/16.7, 320.1, 320.2, DIG. 9; 172/36, 42, 53, 54, 54.5, 79, 84, 93, 102, 103, 117, 247, 101; 171/101

[56] References Cited

U.S. PATENT DOCUMENTS

| | | | |
|---|---|---|---|
| 934,238 | 9/1909 | Tripp | 172/42 |
| 1,623,321 | 4/1927 | Smith et al. | 172/247 X |
| 1,750,586 | 3/1930 | Field et al. | 172/84 X |
| 2,515,343 | 7/1950 | Gravely | 56/17.6 |
| 2,906,514 | 9/1959 | Becker | 299/37 |
| 3,204,704 | 9/1965 | Goette | 172/84 |
| 3,406,761 | 10/1968 | Ryan | 172/42 |
| 3,921,373 | 11/1975 | Rubin | 172/42 X |
| 3,977,477 | 8/1976 | Wise | 172/247 X |
| 3,982,593 | 9/1976 | Grobey | 172/102 X |
| 4,077,731 | 3/1978 | Holz, Sr. et al. | 172/42 X |
| 4,096,915 | 6/1978 | Groth | 172/84 X |
| 4,558,745 | 12/1985 | Ley | 172/102 X |
| 4,942,725 | 7/1990 | Ruder, Sr. | 56/17.6 X |

FOREIGN PATENT DOCUMENTS

| | | | |
|---|---|---|---|
| 120932 | 2/1946 | Australia | 172/42 |
| 1507255 | 1/1970 | Germany | 56/17.6 |

OTHER PUBLICATIONS

Jacobsen Power Unit and Attchments, Jun., 1952, Jacobsen Manufacturing Company, Racine, Wis.
Choremaster Ground Tools, ©May, 1948, Special Products Div. The Lodge & Shipley Company, 800 Evans St., Cincinnati, Ohio.

*Primary Examiner*—Dennis L. Taylor
*Assistant Examiner*—Christopher J. Novosad
*Attorney, Agent, or Firm*—Richard L. Miller

[57] ABSTRACT

A multiple purpose agricultural power tool is provided which consists of a removable cover to fit over an open top of a housing, a wheel assembly which is rotatable and mounted to the housing, so that it can travel along the ground and a pair of legs affixed to a rearward bottom edge of the housing for stabilizing the housing when not traveling along the ground. A power source is carried within the housing for producing rotary motion and a mechanism is carried within the housing for converting the rotary motion to a reciprocating motion. A shank coupled to the converting mechanism extends downwardly at an angle from a front wall of the housing. A detachable implement is coupled to the shank for performing a garden task on the ground. The power tool is also provision to supply power to alternative connectable auxiliary power implement.

5 Claims, 2 Drawing Sheets

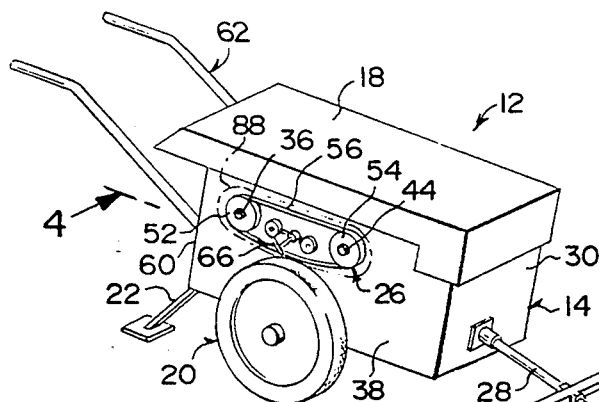
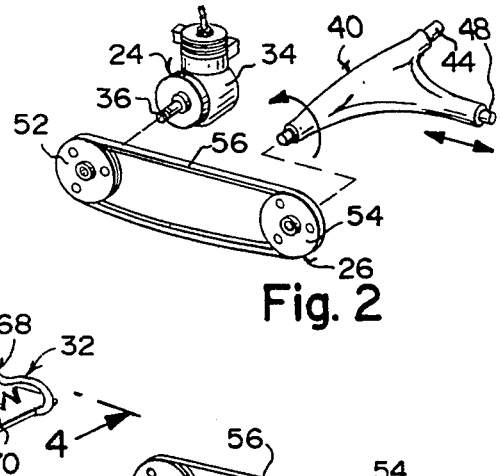
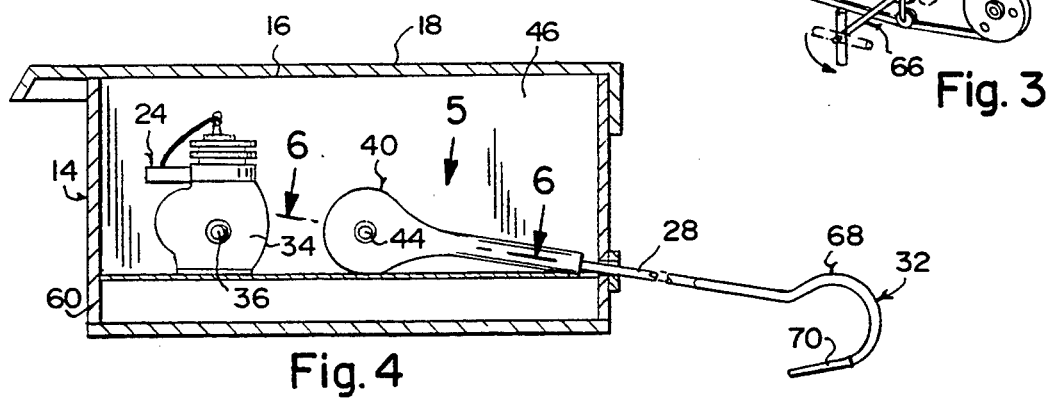
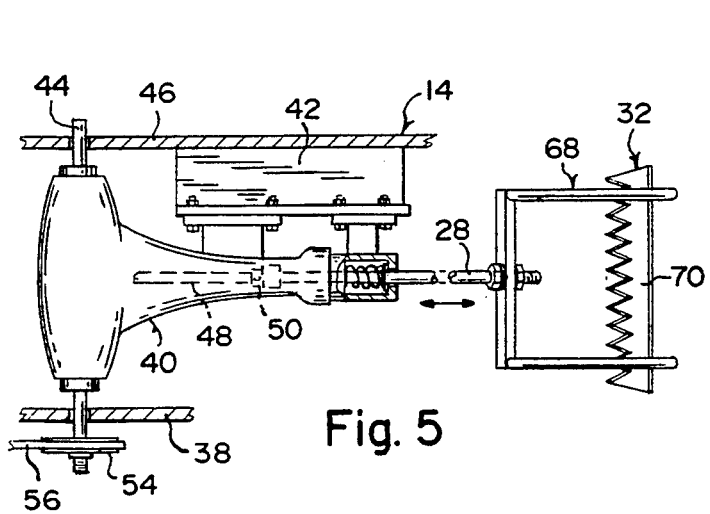
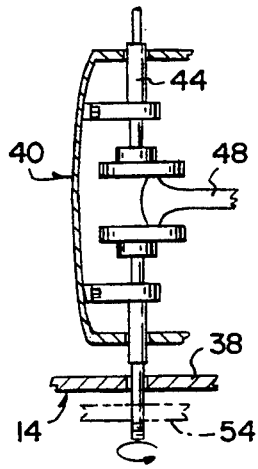

MULTIPLE PURPOSE AGRICULTURAL POWER TOOL

BACKGROUND OF THE INVENTION

The instant invention relates generally to lawn equipment and more specifically it relates to a multiple purpose agricultural power tool.

Numerous lawn equipment have been provided in prior art that are adapted to remove weeds, collect weeds and for performing a variety of other functions in the yard and garden. For example, U.S. Pat. Nos. 4,027,733 to Eisenhardt et al.; 4,467,591 to Dynie and 4,964,472 to Cleworth all are illustrative of such prior art. While these units may be suitable for the particular purpose to which they address, they would not be as suitable for the purposes of the present invention as heretofore described.

SUMMARY OF THE INVENTION

A primary object of the present invention is to provide a multiple purpose agricultural power tool that will overcome the shortcomings of the prior art devices.

Another object is to provide a multiple purpose agricultural power tool in which a variety of coupling implements can each be attached to the tool by a person, so as to perform different garden tasks thereby saving the person the cost of purchasing separate implements.

An additional object is to provide a multiple purpose agricultural power tool that will save time and prevent back aching work for the person using the power tool.

A further object is to provide a multiple purpose agricultural power tool that is simple and easy to use.

A still further object is to provide a multiple purpose agricultural power tool that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The figures on the drawings are briefly described as follows:

FIG. 1 is a diagrammatic perspective view showing some components of the instant invention assembled as a weed pulling machine;

FIG. 2 is a diagrammatic exploded perspective view with parts broken away illustrating the power source and transmission mechanism thereof;

FIG. 3 is a diagrammatic perspective view of the belt engaging mechanism shown in greater detail;

FIG. 4 is a diagrammatic cross sectional view taken on line 4—4 in FIG. 1 with parts removed;

FIG. 5 is an enlarged diagrammatic top view partially in section taken in the direction of arrow 5 in FIG. 4 with parts broken away illustrating the internal components thereof in greater detail;

FIG. 6 is an enlarged diagrammatic cross sectional view taken on line 6—6 of FIG. 4 with parts broken away;

DETAILED DESCRIPTION OF THE PREFERRED EMBODIMENTS

Figure 7:
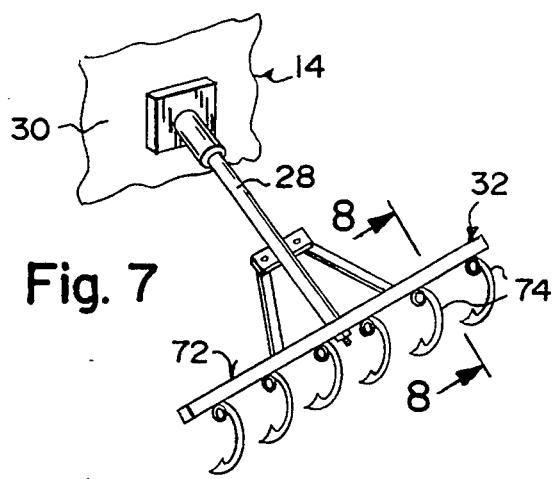
FIG. 7 is a diagrammatic perspective view with parts broken away showing an alternate earth cultivating rake mounted on the instant invention.

Turning now descriptively to the drawings, in which similar reference characters denote similar elements throughout the several views, the Figures illustrate a multiple purpose agricultural power tool 12 which consists of a housing 14 having an open top 16. A removable cover 18 fits over the open top 16 of the housing 14, so as to gain access within the housing 14 when the cover 18 is removed. A wheel assembly 20 is rotatively mounted on the housing 14, so that the housing can travel along the ground. A pair of legs 22 are affixed to a rearward bottom edge of the housing 14 for stabilizing the housing when not traveling along the ground. A power source 24 is carried within the housing 14 for producing rotary motion. A mechanism 26 is carried within the housing 14 for converting the rotary motion from the power source 24 to reciprocating motion. A shank 28 is coupled to the converting mechanism 26 and extends downwardly at an angle from a front wall 30 of the housing 14. A detachable implement 32 is coupled to a distal end of the shank 28 for performing a garden task on the ground.

The power source 24 is typically a rotary gas engine 34 mounted within the housing 14. The engine 34 has a shaft 36 extending through a side wall 38 of the housing 14. The converting mechanism 26 includes a crankcase assembly 40 mounted within the housing 14, via a bracket 42. The crankcase assembly 40 has a crankshaft 44 with both ends extending through the side walls 38 and 46 of the housing 14. A rod 48 is rotatively connected at a first end to the crankshaft 44 and a second end is coupled at 50 to the shank 28. A first pulley 52 is mounted on the shaft 36 of the engine 34. A second pulley 54 is mounted on the end of the crankshaft 44 on the same side as the first pulley 52. A continuous belt 56 extends between the first pulley 52 and the second pulley 54.

Figure 10:
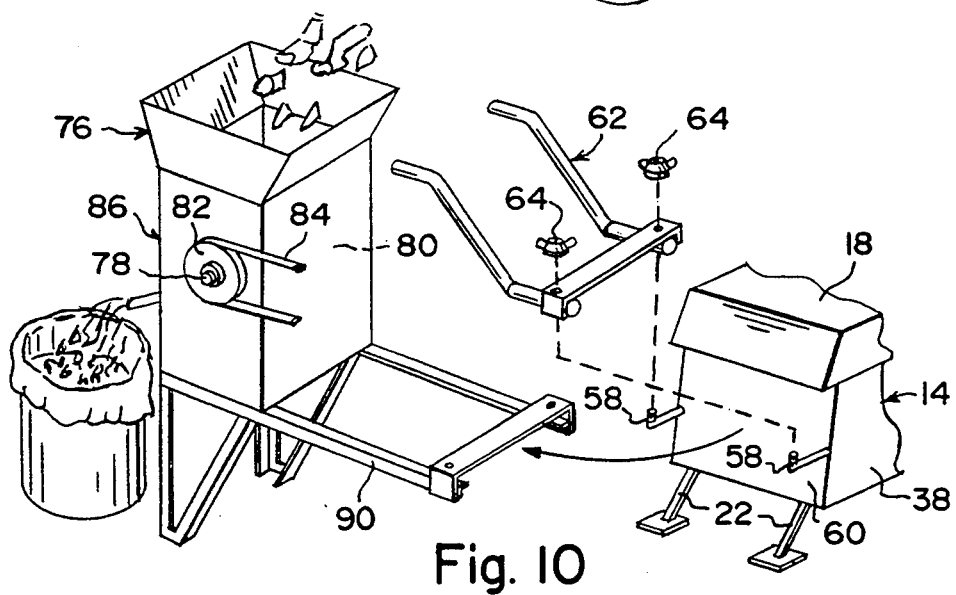
FIG. 10 is a diagrammatic exploded perspective view with parts broken away illustrating how some components of the invention are assembled for use as either a mulching machine or a weed puller/cultivator machine.

As best seen in FIG. 10, a pair of L-shaped threaded shanks 58 are spaced apart and connected to a rear wall 60 of the housing 14. A handle assembly 62 is coupled to the L-shaped threaded shanks 58. A pair of wing nuts 64 are provided, with each threadable onto one of the L-shaped threaded shanks 58 to retain the handle assembly 62 thereto. A person can push and or guide the housing 14 by the handle assembly 62 along the ground via the wheel assembly 20.

A belt engaging mechanism 66, as best seen in FIG. 3, is mounted to the side wall 38 of the housing 14 between the first pulley 52 and the second pulley 54, so as to take the slack out of the belt 56 that is normally loose fitting therebetween, thereby acting as a clutch.

Figure 8:
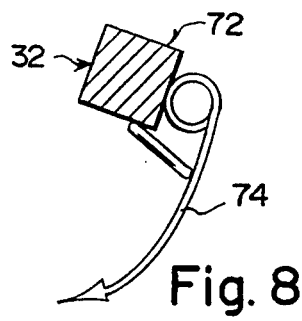
FIG. 8 is an enlarged diagrammatic cross sectional view taken on line 8—8 of FIG. 7.

The detachable implement 32, shown in FIGS. 1, 4 and 5, is a weeder 68 having a toothed blade 70 which will pull out weeds from the ground. The detachable implement 32, shown in FIGS. 7 and 8, is an earth cultivating rake 72 having a plurality of downwardly curved tines 74 which will cultivate the ground.

Figure 9:
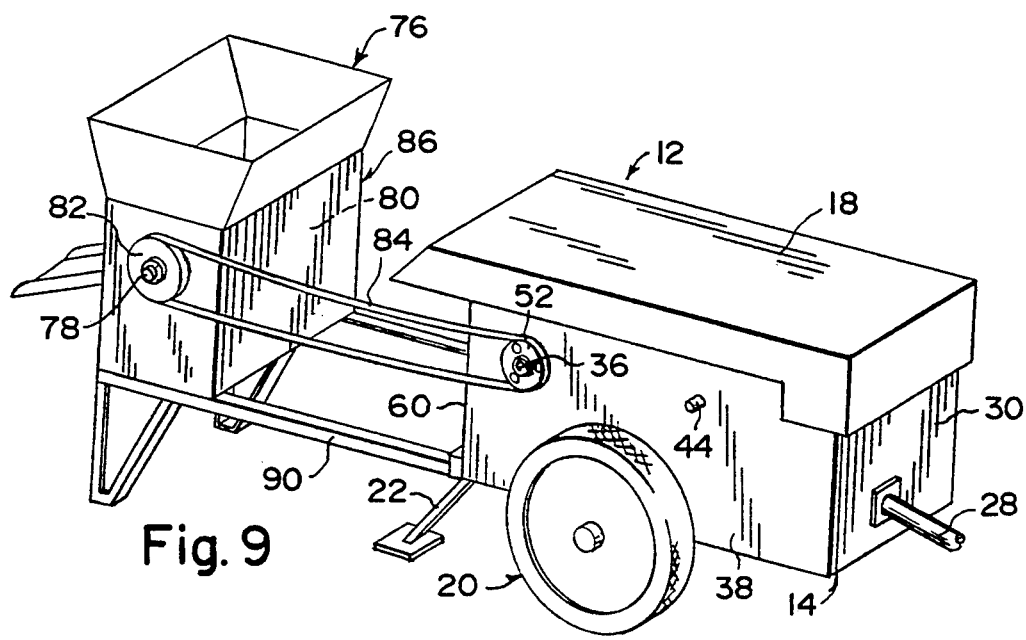
FIG. 9 is an enlarged diagrammatic perspective view illustrating the instant invention assembled ready for use as a mulching machine.

As shown in FIGS. 9 and 10, an auxiliary power implement 76 having a shaft 78 connected to an internal mechanism 80 therein, can also be utilized. A support frame 90 alternately may be coupled to the L-shaped threaded shanks. The pair of wing nuts 64 are each threadable onto one of the L-shaped threaded shanks 58 to retain the support frame 90 of the auxiliary power implement 76 thereto. The first pulley 52 is mounted on the shaft 36 of the engine 34. An auxiliary pulley 82 is mounted on the shaft 78 of the internal mechanism 80. A different continuous belt 84 now extends between the first pulley 52 and the auxiliary pulley 82, so that the rotary gas engine 34 can operate the internal mechanism 80 of the auxiliary power implement 76.

The auxiliary power implement 76 can be a hopper 86 as illustrated, so that the power tool 12 can function as a mulching machine or other units, such as but not limited to a water pump, a generator, a compressor and similar operable components. An optional guard 88 is sown in phantom in FIG. 1, so as to cover and protect the first pulley 52, the second pulley 54 and the continuous belt 56.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A multiple purpose agricultural power tool which comprises:
   a) a housing having an open top;
   b) a removable cover to fit over said open top of said housing, so as to permit access within said housing when said cover is removed;
   c) a wheel assembly rotatively mounted to said housing, so that said housing can travel along the ground;
   d) a pair of legs affixed to a rearward bottom edge of said housing for stabilizing said housing when not traveling along the ground;
   e) a power source carried within said housing for producing rotary motion, wherein said power source is a rotary gas engine mounted within said housing, said engine having a shaft extending through a side wall of said housing;
   f) means carried within said housing for converting the rotary motion from said power source to reciprocating motion, wherein said converting means includes:
      I) a crankcase assembly mounted within said housing, said crankcase assembly having a crankshaft with both ends extending through the side walls of said housing and a rod which is rotatively connected at a first end to said crankshaft and a second end coupled to said shank;
      II) a first pulley mounted on said shaft of said engine;
      III) a second pulley mounted one end of said crankshaft on same side of said housing as said first pulley; and
      IV) a continuous belt extending between said first pulley and said second pulley;
   g) a shank coupled to said converting means and extending downwardly at an angle from a front wall of said housing;
   h) a detachable implement coupled to a distal end of said shank for performing a..garden task on the ground;
   i) a pair of L-shaped threaded shanks spaced apart and connected to a rear wall of said housing;
   j) a handle assembly adapted to be coupled to said L-shaped threaded shanks; and
   k) a pair of wing nuts, each threadable onto one of 16 said L-shaped threaded shanks to retain said handle assembly thereto, so that a person can push and/or guide said housing by said handle assembly along the ground via said wheel assembly.

2. A multiple purpose agricultural power tool as recited in claim 1, further including a belt engaging mechanism mounted to the side wall of said housing between said first pulley and said second pulley, so as to take the slack out of said belt that is normally loose fitting therebetween thereby acting as a clutch.

3. A multiple purpose agricultural power tool as recited in claim 2, wherein said detachable implement is a weeder having a toothed blade for pulling out weeds from the ground.

4. A multiple purpose agricultural power tool as recited in claim 2, wherein said detachable implement is an earth cultivating rake having a plurality of downwardly curved tines for cultivating the ground.

5. A multiple purpose agricultural power tool comprising:
   a) a housing having an open top;
   b) a removable cover to fit over said open top of said housing, so as to permit access within said housing when said cover is removed;
   c) a wheel assembly rotatively mounted to said housing, so that said housing can travel along the ground;
   e) a power source carried within said housing for producing rotary motion;
   f) means carried within said housing for converting the rotary motion from said power source to reciprocating motion;
   g) a shank coupled to said converting means and extending downwardly at an angle from a front end wall of said housing; and
   h) a detachable implement coupled to a distal end of said shank for performing a garden task on the ground;
   wherein said power source is a rotary gas engine mounted within said housing, said engine having a shaft extending through a side wall of said housing;
   i) a pair of L-shaped threaded shanks spaced apart and connected to a rear wall of said housing;
   j) an auxiliary power implement having a shaft connected to an internal mechanism therein and a support frame for coupling to said L-shaped threaded shanks;
   k) a pair of wing nuts, each threadable onto one of said L-shaped threaded shanks to retain said support frame of said auxiliary power implement thereto;
   l) a first pulley mounted on said shaft of said engine;
   m) a second pulley mounted on said shaft of said internal mechanism; and
   n) a continuous belt extending between said first pulley and said second pulley, so that said rotary gas engine can operate said internal mechanism of said auxiliary power implement.

* * * * *